US008807993B2

(12) United States Patent
Sceats et al.

(10) Patent No.: US 8,807,993 B2
(45) Date of Patent: Aug. 19, 2014

(54) SYSTEM AND METHOD FOR THE CALCINATION OF MINERALS

(75) Inventors: Mark Geoffrey Sceats, Pyrmont (AU); Connor James Horley, Southport (AU); Patricia Richardson, legal representative, Coombabah (AU)

(73) Assignee: Calix Ltd., Gordon NSW (AU)

( * ) Notice: Subject to any disclaimer, the term of this patent is extended or adjusted under 35 U.S.C. 154(b) by 1592 days.

(21) Appl. No.: 12/295,468

(22) PCT Filed: Apr. 2, 2007

(86) PCT No.: PCT/AU2007/000424

§ 371 (c)(1),
(2), (4) Date: Jul. 22, 2010

(87) PCT Pub. No.: WO2007/112496

PCT Pub. Date: Oct. 11, 2007

(65) Prior Publication Data

US 2011/0008227 A1    Jan. 13, 2011

(30) Foreign Application Priority Data

| Mar. 31, 2006 | (AU) | ................................ | 2006901658 |
| Apr. 18, 2006 | (AU) | ................................ | 2006901994 |
| May 3, 2006 | (AU) | ................................ | 2006902293 |
| Aug. 22, 2006 | (AU) | ................................ | 2006904553 |
| Oct. 23, 2006 | (AU) | ................. | PCT/AU2006/001572 |
| Feb. 9, 2007 | (AU) | ................................ | 2007900684 |

(51) Int. Cl.
*F27B 15/00*        (2006.01)

(52) U.S. Cl.
USPC ................. 432/18; 432/58; 432/95; 432/215; 95/110; 95/112

(58) Field of Classification Search
USPC ............... 432/14, 15, 18, 58, 95, 96, 99, 207; 432/215; 266/197; 95/107–112
See application file for complete search history.

(56) References Cited

U.S. PATENT DOCUMENTS 736,869 A    8/1903   McTighe
(Continued)

FOREIGN PATENT DOCUMENTS

| AU | 55715 73 A | 11/1974 |
| AU | 199477474 C1 | 5/1995 |

(Continued)

OTHER PUBLICATIONS

Eigen, H. et al; Manufacturing Half-Decarbonised Dolomite with Active MgO in a Rotary Kiln; Zement-Kalk-Gips; 1955; pp. 44-47; vol. 8(2).

(Continued)

*Primary Examiner* — Gregory A Wilson
(74) *Attorney, Agent, or Firm* — Crain, Caton & James

(57) ABSTRACT

A system and method for the calcination of minerals. The system comprises a vertically disposed reactor segment configured to impart horizontal forces on particles passing through the reactor segment in a vertical direction; an injector unit for receiving granular feedstock, the injector unit being disposed at a top portion of the reactor segment, whereby granules of the feedstock move through the reactor segment in a granular flow under at least one of a group consisting of a force of steam, gravitational force and a centrifugal force; a reactor heat exchange unit thermally coupled to a wall of the reactor segment for providing heat to the flowing granules inside the reactor segment through heat transfer through the wall of the reactor segment; one or more inlets formed in the reactor segment for introducing a superheated gas into the reactor segment to create conditions of a gas-solid multiphase system; and one or more exhaust openings formed in the retort segment such that gas products are at least partially flushed from the reactor segment under the flow of the superheated gas from the inlets to the exhaust openings.

16 Claims, 5 Drawing Sheets

(56) References Cited

U.S. PATENT DOCUMENTS

| | | | |
|---|---|---|---|
| 1,634,505 A | 7/1927 | McCaughey | |
| 1,798,802 A | 3/1931 | Niles | |
| 1,810,313 A | 6/1931 | Hyde | |
| 2,015,642 A | 9/1935 | Walker | |
| 2,068,882 A | 1/1937 | Walker | |
| 2,080,981 A | 5/1937 | Haas | |
| 2,113,522 A | 4/1938 | Walker | |
| 2,155,139 A | 4/1939 | MacIntire | |
| 2,289,329 A | 7/1942 | Prickett | |
| 2,784,956 A * | 3/1957 | Vogel | 423/176 |
| 2,790,505 A | 4/1957 | Dow | |
| 2,992,065 A | 7/1961 | Feustel et al. | |
| 3,573,893 A | 4/1971 | Wadsted et al. | |
| 3,684,476 A | 8/1972 | Wadsted | |
| 3,991,172 A | 11/1976 | Wicke et al. | |
| 4,017,585 A * | 4/1977 | Angevine et al. | 423/157.5 |
| 4,145,404 A | 3/1979 | Miyata et al. | |
| 4,226,839 A | 10/1980 | O'Neill et al. | |
| 4,235,425 A * | 11/1980 | Beggs et al. | 266/147 |
| 4,299,563 A * | 11/1981 | Bryant, II | 432/58 |
| 4,479,920 A | 10/1984 | Dodson | |
| 4,673,620 A | 6/1987 | Shulman et al. | |
| 4,740,157 A * | 4/1988 | D'Agrosa | 432/14 |
| 4,748,010 A | 5/1988 | Walker | |
| 4,828,617 A | 5/1989 | Csillag et al. | |
| 5,041,333 A | 8/1991 | Conroy | |
| 5,122,350 A | 6/1992 | Bryan | |
| 5,167,705 A | 12/1992 | Coughlan | |
| 5,211,733 A * | 5/1993 | Fukao et al. | 65/395 |
| 5,653,948 A | 8/1997 | Kato et al. | |
| 5,769,627 A * | 6/1998 | Chisaki et al. | 432/95 |
| 5,779,464 A | 7/1998 | Fan et al. | |
| 5,904,750 A | 5/1999 | Cowles | |
| 6,103,360 A | 8/2000 | Caldwell et al. | |
| 6,200,381 B1 | 3/2001 | Rechichi | |
| 6,231,650 B1 | 5/2001 | Mallow et al. | |
| 6,280,509 B1 | 8/2001 | Mallow | |
| 6,334,894 B1 | 1/2002 | Kostuch | |
| 6,783,799 B1 | 8/2004 | Goodson | |
| 7,025,940 B2 | 4/2006 | Shah et al. | |
| 2004/0194656 A1 | 10/2004 | Mallow | |
| 2005/0060985 A1 | 3/2005 | Garcia et al. | |
| 2006/0039853 A1 | 2/2006 | Fan et al. | |
| 2006/0093540 A1 | 5/2006 | Fan et al. | |
| 2008/0257158 A1 | 10/2008 | Howard | |
| 2011/0113957 A1 | 5/2011 | Sceats | |

FOREIGN PATENT DOCUMENTS

| | | |
|---|---|---|
| AU | 2002/301717 A1 | 4/2004 |
| DE | 3738301 A1 | 11/1987 |
| DE | 3738301 A1 | 5/1989 |
| EP | 328-051 | 2/1988 |
| EP | 530-940 | 3/1993 |
| EP | 1661460 A1 | 5/2006 |
| FR | 1532049 A | 7/1968 |
| GB | 339105 A1 | 12/1930 |
| GB | 1207612 | 10/1970 |
| GB | 1270359 A | 4/1972 |
| GB | 2043219 A | 10/1980 |
| GB | 2168984 | 7/1986 |
| JP | 2001-026754 | 1/2001 |
| JP | 2001-26754 | 1/2001 |
| KR | 20010093389 A | 10/2001 |
| KR | 20010093904 A | 10/2001 |
| RU | 2096380 | 11/1997 |
| RU | 2170044 C1 | 7/2001 |
| SU | 1774922 | 11/1992 |
| SU | 1774922 A3 | 11/1992 |
| WO | 9401203 A1 | 1/1994 |
| WO | 97/01615 A3 | 1/1997 |
| WO | 99/05688 A1 | 2/1999 |
| WO | 00/05178 A1 | 2/2000 |
| WO | 00/48709 A1 | 8/2000 |
| WO | 03/085039 | 10/2003 |
| WO | 2005/013695 A1 | 2/2005 |
| WO | 2005/046862 A1 | 5/2005 |
| WO | 2006/043820 A1 | 4/2006 |
| WO | 2007035421 C1 | 3/2007 |
| WO | 2007/045050 A1 | 4/2007 |

OTHER PUBLICATIONS

Shimizu et al; A twin fluid-bed reactor for removal of CO2 from combustion processes; Department of Chemistry and Chemical Engineering, Nigata University, Japan; vol. 77 Part A; Jan. 1999.

Abanades et al; Conversion Limits in the Reaction of CO2 with Lime; Department of Energy and Environment; 2003; pp. 308-315.

Written Opinion of the International Searching Authority—PCT/AU20067000424; May 29,2007; 3 pages.

B.S. Terry et al; Catalysis by Water Vapour of Thermal Decomposition of Calcium Carbonate; Trans Inst. Mining and Metallurgy; 103; 1994; C62-C68.

Wang, Yong et al; The Effects of Steam and Carbon Dioxide on Calcite Decomposition Using Dynamic X-Ray Diffraction; Chemical Engineering Science; vol. 50 No. 9;1995; pp. 1373-1382.

Khinast et al; Decomposition of Limestone: the Influence of CO2 and Particle Size on the Reaction Rate; Chemical Engineering Science; vol. 51 No. 4; 1996; pp. 623-634.

Rothon, Roger Norman et al; Magnesium hydroxide filled EVA: The effects of filler surface modification on the strength of filler/matrix adhesion and the consequences for composite structure and properties; The Journal of Adhesion; vol. 78; Issue 7; 2002; pp. 603-328.

Beruto et al; Use of the Langmuir Method for Kinetic Studies of Decomposition Reactions: Calcite (CaCO3); Feb. 1974; pp. 2145-2153.

Troitzsch; Flame Retardant Polymers; Makromol. Chem., Makromol. Symp.; 74; 1993; pp. 125-135.

Sawai et al; Quantitative Evaluation of Anitfungal Activity of Metallic Oxide Powders (MgO,CaO and ZnO) by an Indirect Conductimertric Assay; Journal of Applied Microbiology; 2004; 96; pp. 803-809.

Sawai et al; Evaluation of Growth Inhibitory Effect of Ceramics Powder Slurry on Bacteria by Conductance Method; Journal of Chemical Engineering of Japan; 1995; vol. 28 No. 3; pp. 288-293.

E.A.M. Youssef; Characterization, Surface Modification, and Evaluation of Egyptian Dolomite Ore as an Extender Pigment for Paint; Pigment & Resin Technology; 2002; vol. 31 No. 4; 226-233.

Knibbs; The effect of Steam on Calcination; Lime and Magnesia; pp. 102-104; London, Ernest Benn, (1924).

Schilling, Karl; Recent Experiences in the Treatment of Dringking Water with the Magno Filter; Vom Wasser 1937; vol. 12.

D.P. Butt, et al;Kinetics of Thermal Dehydroxylation and Carbonation of Magnesium Hydroxide; J.Am.Ceram.Soc.; 1996; 79; 1892-1898.

J.E. Readman, et al; The use of in situ Powder X-Ray diffraction in the Investigation of Dolomite as a Potential Reversible High-Temperature CO2 Sorbent; Phys. Chem. Chem. Phys.; 2005; 7; 1214-1219.

Satterfield, et al.; Kinetics of the Thermal Decomposition of Calcium Carbonate; A.I. Ch. E Journal; vol. 5 No. 1; pp. 115-122; (1959).

Written Opinion of the International Searching Authority—PCT/AU2007001835; Jan. 11, 2008; 5 pages.

Gumann, Sina; Supplementary European Search Report; Application No. 06790412.8-1218/ Patent No. 1948565; Jul. 11, 2011; 3 pages; the Hague.

Gumann, Sina; Supplementary European Search Report; Application No. 06804428.8-1218/ Patent No. 1951411; PCT/AU20060011568; Jul. 11, 2011; 7 pages; The Hague.

Abanades, J. Carlos; "Capture of C02 from Combustion Gases in a Fluidized Bed of CaO"; Aiche Journal, New York, NY, US; vol. 50, No. 7; Jul. 1,2007; pp. 1614-1622.

Hughes, Robin W. et al.; "Design, process simulation and construction of an atmospheric dual fluidized bed combustion system for in situ C02 capture using high-temperature sorbents"; Fuel Processing Technology, Elsevier BV, NL; vol. 86, No. 14-15; Oct. 1, 2005; pp. 1523-1531.

(56) References Cited

OTHER PUBLICATIONS

Anthony, Edward J. et al.; "Relationship Between S02 and Other Pollutant Emissions from Fluidized-Bed Combustion"; Twenty-Seventh Symposium (International) on Combustion; vol. 27, No. 2; Jan. 1, 1998; pp. 3093-3101.
Evans, S.M., Leksono, T., and McKinnel, P.D.; "Tributylin Pollution: A Diminishing Problem Following Legislation Limiting the Use of TBT-Based Anti-fouling Paints"; Elsevier Science Ltd., Marine Pollution Bulletin; vol. 30, No. 1; Jan. 1995; pp. 14-21.
First Examination Report; Application No. 1015/MUMNP/2008; Government of India Patent Office, Mumbai, India; Jan. 4, 2012; 2 pages.
First Examination Report; Application No. 1014/MUMNP/2008; Government of India Patent Office, Mumbai, India; Febraury 6, 2012; 1 page.
McKenzie, Clyde, Jr; "Use of Quicklime to Increase Oyster Seed Production"; Aquaculture; 10; 1977; pp. 45-51.
Peis, Stefano; EP Examination Report; Jun. 20, 2011; Application No. 07718671.6-1215; 7 pages; Netherlands.
Dick, J.S.; "Compounding Materials for the Polymer Industries"; Noyes Publishing; 1987; pp. 63 and 144.
E. Cremer, Z: Electrochem; vol. 66; pp. 697-702; 1962.
The Patent Office of the People's Republic of China; Calix Pty Ltd.; Agent: Wu, Xiaonan; Application No. 200680048344.0; A Material Compound and a Method of Fabricating the Same; Issuing Date: Oct. 9, 2011.
Jones, Christopher; Non-Final Rejection; U.S. Appl. No. 12/091,040; Jan. 18, 2013; 13 pages; United States Patent and Trademark Office; Alexandria, US.
Jensen, William P.; Amendment and Response to Office Action dated Jan. 18, 2013; Jul. 18, 2013; 14 pages; Crain, Caton & James; Houston, US.
Stanley Silverman, Non-Final Office Action, U.S. Appl. No. 121091,035, Nov. 7, 2013, 8 pages, United States Patent and Trademark Office, Alexandria, VA, United States.
International Preliminary Report on Patentability—PCT/AU2007/000424; 3 pgs.; Patent Cooperation Treaty; Australian Patent Office; Woden Act, Australia.
Gumann, Sina; European Examination Report; Application No. 06 790 412.8-1218; European Patent Office, Netherlands; Feb. 3, 2012; 5 pages.
Xiaonan, Wu; The Second Office Action; Application No. 2006800048425.3; The Patent Office of the People's Republic of China, Beijing; Mar. 19, 2012; 6 pages.
MacIntyre, W.H., Stansel, T.B.; Steam Catalysis in Calcinations of Dolomite and Limestone Fines; 1953; pp. 1548-1555; Industrial and Engineering Chemistry.
Office Action; Application No. 200680048244; Feb. 12, 2010; 10 pages.
Office Action; Jan. 26, 2011; Application No. 200680048425.6; 3 pages.
Office Action; Application No. 200780020180.8; Mar. 11, 2010; 8 pages.
Notice of Acceptance; Application No. 2007233570; Nov. 5, 2010; 3 pages.
The Prospects for Carbon Capture and Storage; International Energy Agency; 2004; 252 pages.
C. Henderson; Clean Coal Technology Roadmaps; London, UK 2003; International Energy Agency; pp. 1-2.
Notice of Acceptance; Application No. 2006303830; Nov. 25, 2010; 4 pages.
Beruto, D T et al; Effect of mixtures of H2O (g) and CO2 on the thermal half decomposition of dolomite natural stone in high CO2 pressure regime; 2003; pp. 25-33; vol. 404; Thermachimica Acta.
Written Opinion—PCT/AU2006/001568; Dec. 5, 2006; 4 pages.
Examiner's Report on Application No. 2002301717; Jun. 10, 2009; 3 pages.
Mckee; Carbon Sequestration Leadership Forum. Final Draft Technology Roadmap, www.cslforum.org; 2004; 32 pages.
Beruto, D.T. et al; Solid Products and Rate-Limiting step on the Thermal Half Decomposition of Natural Dolomite in a CO2 (g) Atmosphere; Thermachimica Acta.; 2003; pp. 183-194; vol. 405.
Notice of Acceptance AU2006303828; Nov. 5, 2010; 3 pages.
Written Opinion of the International Searching Authority; PCT/AU2006/001572; Nov. 29, 2006; 5 pages.
Written Opinion of the International Searching Authority—PCT/AU2006/001573; Nov. 27, 2006; 5 pages.
International Preliminary Report on Patentablility—PCT/AU2007001835; Jun. 3, 2009; 6 pages.
International Preliminary Report on Patentablility—PCT/AU20067000424; Feb. 26,2008; 3 pages.
International Search Report—PCT/AU20067000424; May 29,2007; 4 pages.
Written Opinion—PCT/AU20067000424; May 23,2007; 3 pages.
International Search Report—PCT/AU2007001835; Jan. 11, 2008; 4 pages.
Written Opinion—PCT/AU2007001835; Jan. 3, 2008; 5 pages.
International Search Report; PCT/AU2006/001572; Dec. 13, 2006; 3 pages.
Schilling, Karl; Recent experiences in the Treatment of Drinking Water with the Magno Filter; 1937; pp. 41-74; vol.
International Preliminary Report on Patentability on PCT/AU2006/001568; Oct. 17, 2007; 14 pages.
International Search Report—PCT/AU2006/001573; Nov. 27, 2006; 4 pages.
International Preliminary Report on Patentablility—PCT/AU2006/001573; Sep. 12, 2007; 4 pages.
International Search Report—PCT/AU2006/001568; Dec. 12, 2006; 3 pages.
Sawai et al; Quantitative Evaluation of Antifungal Activity of Metallic Oxide Powders (MgO, CaO and ZnO) by an Indirect Conductimetric Assay; J. Applied Microbiology; 2004; vol. 6; pp. 803-809.

* cited by examiner

SYSTEM AND METHOD FOR THE CALCINATION OF MINERALS

FIELD OF INVENTION

The present invention relates broadly to a system and method for the calcination of minerals.

BACKGROUND

Calcination of rocks and ores of materials such as metal carbonates to produce their oxide forms is a major contribution to green house gas emissions. Calciners that are used today are generally vertical kilns that are optimised for their overall energy efficiency. A typical vertical kiln calcines limestone by consuming 3.6 GJ per tonne of lime in best practice, compared to the thermodynamic limit of 3.18 GJ per tonne. These vertical kilns have generally replaced the earlier, inefficient, horizontal rotary kilns. Other kilns that have been employed for specific uses include fluid bed reactors and circulating fluid bed reactors.

Carbon Dioxide Emissions

It has been recognised that calcination is a major greenhouse gas generator, responsible for 2.5% of all emissions from human activity. The calcination of carbonates produces carbon dioxide intrinsically, while the combustion process, as generally used to provide the heat, also produces carbon dioxide. The mass and energy balances of the two processes demonstrate that each tonne of limestone produces 0.44 tonnes of carbon dioxide, and the combustion of, say, LPG to produce 3.18 GJ of heat produces another 0.21 tonnes of carbon dioxide, giving total emissions of 0.65 tonnes of carbon dioxide per tonne of lime produced under ideal conditions. Non-ideal conditions can produce significantly more carbon dioxide.

In the calcination processes widely used today for both the production of lime and clinker, the carbon dioxide from the intrinsic reaction and the burning of fuel is produced in the calciner, and is vented to the atmosphere as a pollutant. Mediation of this emission is made difficult by the fact that the carbon dioxide is also mixed with nitrogen and other flue gases, so that an expensive step of separating these gases is required as the first step in carbon capture. Industry is currently under considerable pressure to minimise emissions of carbon dioxide, and the separation of carbon dioxide from nitrogen and most of the other gases is currently uneconomical.

Reactors Using Heat Transfer

There have been a number of alternative processes suggested that could be used as the basis for an improved, environmentally beneficial, calcination process. One approach is to separate the combustion and calcination processes by using heat transfer, thereby removing the need to separate the carbon dioxide released from the calcination reaction from the flue gases. Saddy et al (WO 97/01615) describe a thermal radiation furnace in which an external source is used to heat the contents of the calciner by radiative heat transfer. In their system the material is fed through the calciner as a pile controlled by a rotary valve, for example, at the lowest part of the furnace, with a long residence time. This approach has an additional beneficial effect of reducing the concentration of carbon dioxide in the calciner so that the quenching of the reaction by carbon dioxide may be partially suppressed. This quenching is a well studied problem, for example, as reported by E. Cremer, Z. Electrochem, 66 pp. 697-702 (1962). A lowering of the carbon dioxide concentration allows the calcination process to proceed at a lower temperature.

The use of external heating, however, potentially comes at a cost of energy. In conventional kilns that use internal combustion, there is efficient heat transfer to the material, and the heat loss from the flue gases is minimised by careful recuperation of heat back to the feedstock and fuel. Best practice is typically a 20% heat loss. The cost of fuel is generally a large component of the operating cost of a kiln. If burners are used to provide external heat, the heat loss can be considerable, in the order of 30%. Shah at al (U.S. Pat. No. 7,025,940) disclose an approach to external heating, called Flameless Distributed Combustion (FDC), in which the combustion of the fuel occurs as essentially a homogeneous chemical reaction. The requirements are that the fuel, such as natural gas, ethanol, diesel or biodiesel is mixed with air which has been heated such that the temperature in the heater section is above the auto-ignition temperature. To achieve a uniform temperature, the rate of combustion must be slower than the mixing time of the gases in the reactor, and multiple injection points are used. Carbon formation by pyrolysis in the fuel heating section can be suppressed by the injection of $CO_2$ and steam in that section. The heat transfer efficiency of FDC is claimed to be as high as 95%. The uniformity ensures that hotspots do not form on the heat exchange surfaces. Thus the use of FDC in an externally heated calciner can potentially be more efficient than current best practice for conventional kilns with internal combustion. The lower temperature of the system, compared to that of a flame, is such that $NO_x$ and CO production is very small. FDC can also be accomplished by incorporating a porous material into the burner, so that the feedback of heat that creates the energy efficiency of FDC is accomplished on a micron scale. The benefit of using a porous material is that the radiative heat transfer from the combustor to the reactor surface is optimised.

The Catalytic Effect of Steam

The use of superheated steam in calcination was proposed by Niles (U.S. Pat. No. 1,798,802, issued 1931), who described a process in which the superheated steam reacts with a fuel placed inside the kiln to produce carbon monoxide. Walker (U.S. Pat. No. 2,068,882, issued 1937) proposed to use superheated steam in place of a vacuum for calcination by electrical heat, Vogel (U.S. Pat. No. 2,784,956, issued 1957) improved The process. A characteristic of these processes is that the feedstock size is significantly larger than 100 microns, so that the role of the superheated steam is either as a reactant to oxidise the introduced fuel or to assist the heat transfer in the partial vacuum to the feedstock.

MacIntyre and Stansel, Ind and Eng Chem 45, 1548-1555 (1953), conducted calcination experiments of limestone and dolomite, and demonstrated that the temperature for calcination of limestone under the experimental conditions used decreases from 910° C. in air to 700° C. in superheated steam, and of dolomite from 690° C. in air to 550° C. in superheated steam, thereby suggesting a catalytic effect for a given carbon dioxide partial pressure. In their experiments, the carbon dioxide and steam were pumped from the system at a rate such that the deleterious effect of the back reaction was reduced. Terry and McGurk, Trans Inst Mining and Metallurgy, 103, C62-C68 (1994) conducted Differential Thermal Analysis experiments, and proposed that the catalysis of limestone by superheated steam occurs through an activated calcium bicarbonate intermediate. Thompson et al, Chem Eng Sci, 50, 1373-1382 (1995), using dynamic X-ray diffraction evaluated the kinetics of the catalysis, and demonstrated that the catalysis occurred by the adsorption of water molecules onto the surface, which weakened the binding of carbon dioxide. They showed that the catalytic effect increased with temperature, with the enhancement depending on the superheated steam partial pressure.

In conventional kilns, The feedstock size is significantly greater than 100 microns, and often substantially greater (10-100 mm), such that the catalytic effect of introduced superheated steam is masked by the slower processes of heat and mass transport within the feedstock rocks. In a conventional kiln, superheated steam acting as a reactant for combustion or to assist with heat transfer, would therefore have little impact on the rate of calcination.

Horley (AU 199477474 A1 and AU 2002301717A1) describes a batch calciner which takes advantage of steam catalysis so that calcination of a charge of ground granules can occur during a gravitational drop of a charge through superheated steam. This process is limited in throughput because the chemical energy required for the reaction is provided by the thermal energy of the steam. For the process in Horley to apply to a continuous process, the required feed rate of steam would be excessive.

The Use of Granules in Calciners

Wicke and Wuhrer (U.S. Pat. No. 3,991,172, granted 1976) proposed that the calcination of finely ground limestone (size <100 micron), without superheated steam, with rapid heating and cooling of the order of seconds gave a highly reactive lime (eg as measured by the reaction of the cooled lime with water) because of the high density of chemical defects in the products' lattice structure. Such reactivity is lost if the retention time is too high because the material begins to restructure at the high temperature in a process akin to annealing that removes the chemical defects. Kato and Nakazawa (U.S. Pat. No. 5,653,948, granted 1997) recognised the benefit of producing a fine calcined reactive lime with a size of 1-100 microns, and describe an approach of producing a calcined product with this size in a fluidized bed calciner, which breaks down the feedstock of 100-1500 microns to this size.

Fluid Bed Reactors

Fluid bed reactors generally operate by balancing the gravitational force acting on the granules by the buoyancy of the fluid phase. However, this approach is generally inappropriate for calcining finely ground feedstock of 30-150 microns because the granules are entrained in the gases produced for reasonable gas flows. There are variants of this class of reactor, namely recirculating fluid bed reactors in which the granules are pneumatically circulated through a reactor system using a combination of risers and downers, either of which may be an integral part of the reactor. This approach is used in industrial processes such as catalytic cracking of petroleum. However, such reactors have a long distribution of residence times for the granules because the granules are circulated many times before a fraction of the flow is bled off. This is appropriate for the case in which the granules serve as catalysts, but where the product properties are sensitive to the residence time, for example, where they sinter, recirculation is not desirable.

Flash Calciner

There are flash calciners that are known in the art that use ground granules as the feedstock. These systems can have a lower residence time than conventional kilns. However, in these systems the granules are generally entrained in the combustion gas as a result of using burners within the calciner, so that the output of the calciner is a mixture of the combustion and calcination gases, and are emitted to the atmosphere, as for a standard kiln. In another example of a flash calciner, centrifugal forces from the combustion gasses within the calciner are used to retain the granules in the reactor. These approaches, while perhaps reducing the residence time in the calciner, may still have many of the problems outlined above and result in the same net environmental impact as conventional calcination.

There is prior art that describes the calcination of granules in the form of a pile of powder. Ward and Todd-Davies (GB 2043219) describe a calciner in which a pile of powder is heated by a lance that injects combustion gases into the moving pile of such granules. This reactor is limited by the rate of injection of the combustion gas, which otherwise cause the granules to be entrained in the gas and exhausted with the combustion of gases. Thus the residence time of granules in this calciner design is relatively high. As above, the gas exhausted contains both the combustion gas and the calcination gas, such that the process has the same negative environmental impact as conventional calcination.

A need therefore exists to provide a method and system for calcination of minerals that seeks to address at least one of the above mentioned problems.

At least preferred embodiments of the invention seek to address the requirements for flash calcining a granular material in a reactor system that limits the residence time of the granules and which minimizes environmental impacts

SUMMARY

In accordance with a first aspect of the present invention there is provided a system for the calcination of minerals, the system comprising a vertically disposed reactor segment configured to impart horizontal forces on particles passing through the reactor segment in a vertical direction; an injector unit for receiving granular feedstock, the injector unit being disposed at a top portion of the reactor segment, whereby granules of the feedstock move through the reactor segment in a granular flow under at least one of a group consisting of a force of steam, gravitational force and a centrifugal force; a reactor heat exchange unit thermally coupled to a wall of the reactor segment for providing heat to the flowing granules inside the reactor segment through heat transfer through the wall of the reactor segment; one or more inlets formed in the reactor segment fur introducing a superheated steam into the reactor segment to create conditions of a gas-solid multiphase system; and one or more exhaust openings formed in the retort segment such that gas products of the calcination are at least partially flushed from the reactor segment under the flow of the superheated steam from the inlets to the exhaust openings as a mixture of the superheated steam and the gas products.

The reactor segment may comprise one or more reactor chambers and a gas granule separator coupled to the reactor chambers that utilises a vortex formed from the passage of material through the reactor chamber to separate the gas products from the granules.

The system may further comprise two or more reactor chambers and respective coupled gas-granule separators connected in series, such that processed material from one reactor chamber collected utilizing the gas-granule separator coupled to said one reactor chamber are fed into another reactor chamber and collected, after further processing in said other reactor chamber, utilizing the gas-granule separator coupled to said other reactor chamber.

At least one of the gas-particle separator may comprise a heater unit for heating the material collected for providing a trimming reactor functionality.

At least the gas-particle separator coupled to said one reactor chamber further may comprise a pumping unit for pumping the material collected during said heating for suppressing a back reaction.

The reactor segment may comprise a plurality of reactor chambers coupled to one particle separator.

The reactor heat exchange unit may utilize flameless distributed heating, and at least one of the exhaust openings is coupled to the reactor heat exchange unit for directing a portion of the gas products into fuel for the flameless distributed heating for facilitating suppression of pyrolysis.

The reactor segment may comprise one or more linear tubes as reactor chambers and one or more gas particle separators, the gas separators imparting the horizontal forces on the particles.

The reactor segment may comprise one or more spiral tubes respectively formed into a helix as reactor chambers.

The exhaust openings may comprise a central column formed within an inner circumference of the spiral tube, whereby the system exhibits a counter-flow of the gas products with respect to the granules in the spiral tube.

The system may further comprise a conveyer tube coupled to the injector and disposed inside the central column, for conveying the granules from a base of the reactor segment to the injector.

The granules may be conveyed through the conveyer tube under the force of the superheated gas, whereby the injector functions as one of the inlets for introducing the superheated gas into the spiral tube.

The reactor heat exchange unit may comprise a porous flameless distributed heating unit, and one or more of a group consisting of the reactor chamber, the gas granule separator, the central column and the conveyer tube are cast in the porous flameless distributed heating unit.

A residence time of the granules in the reactor chamber may be less than about 10 seconds.

The granules may have a size distribution between about 40 microns to about 250 microns.

In accordance with a second aspect of the present invention there, is provided method for the calcination of minerals, the method comprising the steps of moving granules of a feedstock through a vertically disposed reactor segment in a granular flow under at least one of a group consisting of a force of steam, gravitational force and a centrifugal force; imparting horizontal forces on the particles passing through the reactor segment in a vertical direction; providing heat to the flowing granules inside the reactor segment through heat transfer through the wall of the reactor segment; introducing a superheated gas into the reactor segment to create conditions of a gas-solid multiphase system; and flushing gas products at least partially from the reactor segment under the flow of the superheated gas.

The method may further comprise separating the gas products from the granules utilising a vortex formed from the passage of material through the reactor chamber.

The method may further comprise feeding processed material from one reactor chamber of the reactor segment into another reactor chamber of the reactor segment.

The method may further comprise heating the material collected for providing a trimming reactor functionality.

The method may further comprise pumping the material collected during said heating for suppressing a back reaction.

The method may comprise utilizing a flameless distributed heating unit for heating the reactor chamber wall, and directing a portion of the gas products into fuel for the heating unit for facilitating suppression of pyrolysis.

The reactor segment may comprise one or more linear tubes as reactor chambers and one or more gas particle separators, the gas separators imparting the horizontal forces on the particles.

The reactor segment may comprise one or more spiral tubes respectively formed into a helix as reactor chambers.

The method may further comprise pneumatically conveying the granules to a top of the reactor chamber.

The reactor heat exchange unit may comprise a porous flameless distributed heating unit, and one or more of a group consisting of the reactor chamber, the gas granule separator and a conveyer tube for conveying the granules are cast in the porous flameless distributed heating unit.

A residence time of the granules in the reactor chamber may be less than about 10 seconds.

The granules may have a size distribution between about 40 microns to about 250 microns.

BRIEF DESCRIPTION OF THE DRAWINGS

Embodiments of the invention will be better understood and readily apparent to one of ordinary skill in the art from the following written description, by way of example only, and in conjunction with the drawing, in which.

DETAILED DESCRIPTION

Figure 1:
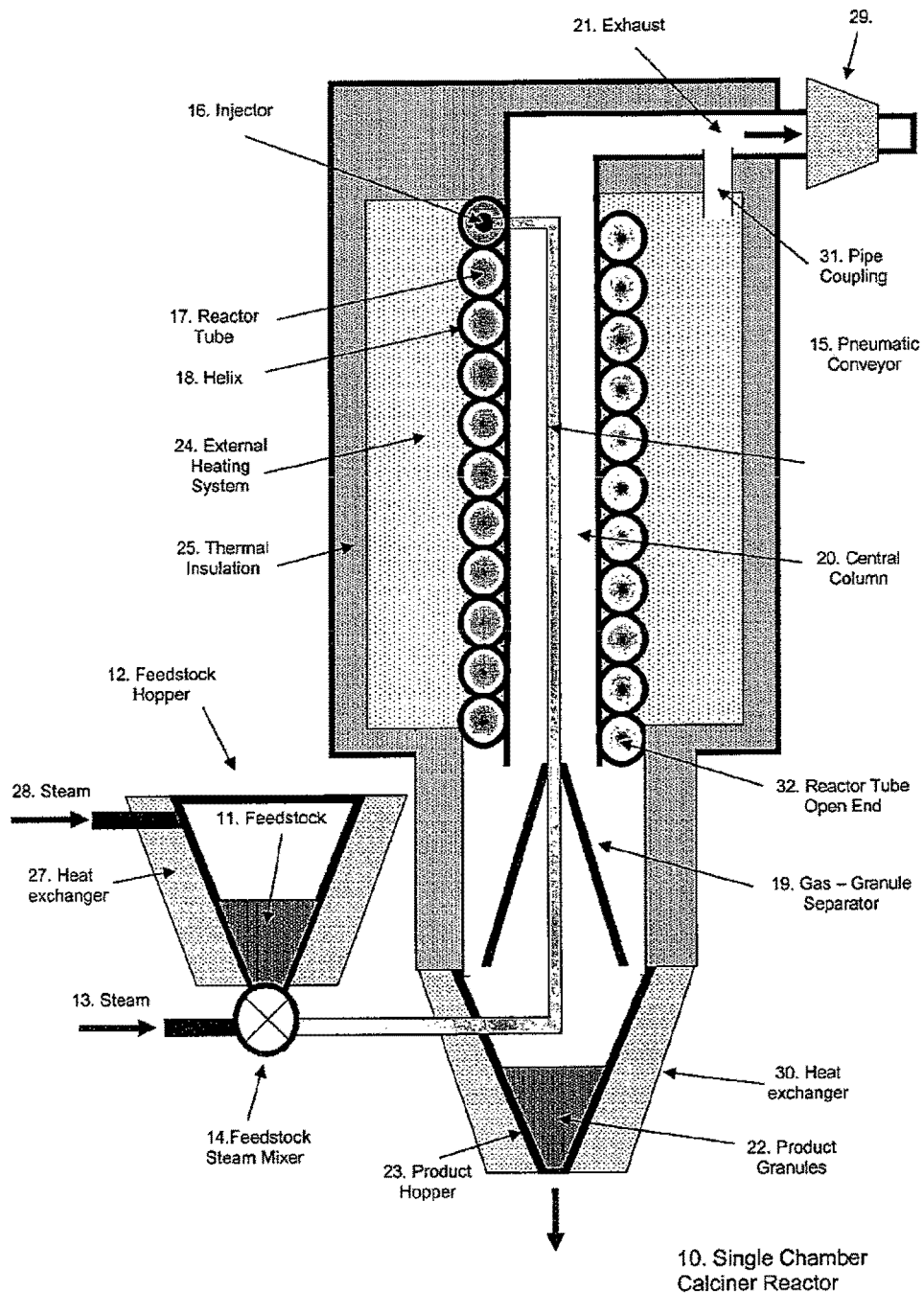
FIG. 1 shows a schematic cross-sectional drawing of a calciner reactor according to an example embodiment.

The example embodiments described provide a continuous calcination system and method. Compact reactors are described incorporating a number of features, which function to accelerate the rate of reaction, such that the required degree of reaction is about 96-98% complete within several seconds, corresponding to the residence time of the granules in the system. Firstly, the catalytic effect of steam acts on the calcination reaction of the granules. Further, by using a number of reactor segments through which the granules may pass sequentially, the deleterious effect of carbon dioxide reincorporation into the material to be calcined is reduced as the carbon dioxide is separated from the granules at the end of each segment. Additionally, the carbon dioxide is flushed from the reactor by injecting superheated steam at the entrance of each reactor segment to lower the partial pressure of carbon dioxide in the reactor, which lowers the partial pressure of carbon dioxide near the exit of the reactor. This superheated steam is injected with an initial gas pressure that is sufficiently high to catalyse the reaction and force the granules through the reactor.

The described embodiments provide a system and process that takes advantage of both the faster chemical kinetics engendered by the catalytic effect of superheated steam in association with a small granule size, and the use of the superheated steam for gas phase heat transfer. At the same time, however, the described embodiments are designed such that the dominant mechanism of heat transfer is from the walls of the calciner directly to the granules as a result of two major factors. That is, the heat transfer arising from the strong interaction of the granules with the gas engendered by the large centrifugal forces acting on the granules and resultant friction with the gas that is imparted to the walls of the reactor tube, and the heat transfer arising from the radiation heating of the granules. The granular flow through the helical tube is significantly slower, than through an equivalent straight tube, and this not only generates the friction required for the above first mechanism for heat transfer, but also controls the transit time through the reactor to allow the heat transfer to take place efficiently. Thus a helical tube can process a higher throughput than a linear tube of the same diameter and length.

Efficient separation of the granules at the exit of each reactor segment is accomplished by an integrated gas granule separator, and by the use of a helical flow within the reactor so that the vortex action required for efficient separation is established prior to injection into the separator unit. The reversal of the gas flow at the separator is accomplished using the same principles as a cyclone separator. That is, the combination of the helical tube reactor and a gas-granule separator based on the vortex within a cyclone operate well in an integrated reactor system. The required centrifugal forces for the separator can be accomplished in one embodiment by the use of a helical tube as the reactor chamber, and in another embodiment by an initial linear tube that is bent to provide the centrifugal forces at near the end of the chamber. A combination of a helical tube as the reactor chamber with additional structures near the end of the reactor chamber for facilitating the centrifugal forces may also be implemented in another embodiment.

Efficient energy use is accomplished in one embodiment by using flameless heating and the desired temperature distribution is achieved by flowing the combustion gases in counterflow to the granules in the calciner. In one embodiment, the combustion gases exchange heat to the reactor walls by convection and conduction. In another embodiment, the heat exchange is enhanced by using a porous medium to impart flameless distributed heating, with the porous material-providing heat transfer by radiation.

In one embodiment, the system can be cast from the porous material used for the combustion system and the transfer of gases between the combustion area and the reaction chamber rendered impermeable by a thin sheath of same material in its impermeable form. In this system, the geometry of the tubes can be varied from linear at the top of the reactor to helical at the base. In another embodiment, a plurality of such reaction chambers can be cast so that they each feed into one gas granule separator.

FIG. 1 shows a single segment vertical calciner reactor 10. The feedstock indicated at 11 is produced from rocks and ores that have been dried, crushed and pre-ground. A feedstock size distribution with a mean size in the range of about 40 microns to about 250 microns is achieved by a conventional cyclone system (not shown) with a crusher and grinder (not shown). The feedstock 11 is collected in a Feedstock Hopper 12 and is mixed with superheated steam 13 in mixer 14 and conveyed pneumatically through a conveyor tube 15 to an injector 16 at the top of the reactor where it is injected into the reactor tube 17. The injector 16 thus functions as both, feeder for the granules into the reactor tube 17, and as an inlet for superheated steam 13 into the reactor tube 17. It will be appreciated that additional inlets may be provided along the tube 17 in different embodiments for feeding super heated steam into the reactor tube 17. The reactor tube 17 is formed into a helix 18, and preferably the helix 18 is formed into a structure which forms a leak proof central column 20. The helix 18 imparts horizontal forces on particles passing through the reactor 10 in a vertical direction. The reaction proceeds in the reaction tube 17 to the desired degree. The superheated steam, the product granules and the reaction gases flow out of the open end 32 of tube 17 and through to the gas-granule separator 19. the reaction tube 17 and the gas-granule separator form a reactor segment in this example embodiment. The gas motion is reversed and the gases are exhausted into the central column 20 by the vortex formed in the separator 19 as a result of the centrifugal forces induced in the helix 18. It will be appreciated that additional exhaust openings may be provided along the tube 17 in different embodiments. The exhausted gases in the central column 20 heat the steam 13 and feedstock 11 being conveyed to the injector 16 before the gases are exhausted at the top of the reactor 21. The exhaust gases can be processed by condensing the steam in a condenser 29 and compressing the gas for other uses. The product granules 22 are collected in the hopper 23, and are rapidly cooled using heat exchanger 30, e.g. with the water used to produce the steam. The reactor tube 17 is heated externally by a heat source 24, and the reactor is thermally insulated 25 to minimise heat loss.

The source of heat for heating the reactor tube 17 can be electrical power, combustion of fuels using burners, combustion of fuels using flameless distributed heating, or a heat exchange fluid produced from some other power source. In the case of combustion, the waste heat from the combustion gases can form part of a heat recuperation system using heat exchangers (not shown). It is preferable that the temperature profile along the reactor tube 17 be controlled so that the heat load along the tube 17 is uniform. This heat load is not only dependent on the temperature, but also on the chemical kinetics through the evolution of the reactive surface area, the steam partial pressure that catalyses the reaction, and the partial pressure of the reaction product gases through their back reaction with the granules, the velocity of the granules and the heat transfer efficiencies.

The parameters of the system 100, such as the heat flow to the heat exchangers, the feedstock injection rates, the superheated steam injection rates at each injector, and the calciner gas pressure can be set by control of the parameters to achieve the desired conversion of calcined feedstock exiting at the base of the hopper 23.

The superheated steam plays a number of roles:
- Creating the initial conditions of a gas-solid multiphase system.
- Catalysing the reaction to enable the reaction process to be complete within the residence time of the feedstock granules in the system.
- Flushing carbon dioxide from the system so as to minimise the quenching of the reaction.
- Enabling the generation of pure carbon dioxide by condensation and scrubbing from the exhaust gas.
- Dislodging granules from surfaces so as to avoid the build up of granule plugs.
- Providing a source of gas for injection into a flameless distributed heater in order to control the reaction rate at the desired temperature.

The feed rate of the feedstock 11 is chosen such that the volume fraction of solid material in the calciner reactor 10 at any time is a small fraction of the volume, about $10^{-3}$ to $10^{-4}$. Thus the reactor 10 operates under dilute multiphase conditions. The granules move downwards in a collective granular flow under the force of the steam and gravity, and are further accelerated by the gases produced by the reaction. The fabrication of the reactor by forming the reactor tube 17 into a helix 18 creates large centrifugal forces on the granules which in turn generates a large friction, such that the granule velocity is 20-40% lower than for an equivalent straight tube. For typical injection rates, the granular phase flow is laminar, whereas the gas phase flow is turbulent. The high gas-granule friction generates a pressure drop down the reactor, and this lowers the partial pressures of both the steam and the reaction gases along the tube 17, both of which influence the reaction rate. In addition, the high friction also increases the thermal relaxation rate between the gases and the granules such that the reaction is driven by the transfer of heat from the tube's 17 surface to both the granules directly and to the gas. For radiative heating, the slowing down of the granules in the helix 18 increases the heat transfer rate through the higher granule density. The strong gas-granule interaction is such that saltation of the granules cannot occur in the helix 18, or is at least significantly minimised.

The residence time of granules in the reactor 10 is determined by the granular flow induced by gravity, the centrifugal forces and the gas velocity and pressures. Typical conditions are such that the residence time is in the order of several seconds. This is sufficiently fast that sintering of the granules is limited. This short residence time is a characteristic of the reactor system 10, and the distribution of residence times is small.

There are a number of features of collective motion of the granules—called "granular flow" herein to distinguish from the flow of a granule that experiences no granule-granule interactions (ie an isolated granule, as would occur at very low granule mass loadings—as in kg s$^{-1}$). Those features include that the granule mass loading of the calciner should preferably be sufficiently high that the granule-granule collisions should be more probable than the granule-wall collisions. This is characterised by the Knudsen number Kn. For a proposed design for an example embodiment, Kn is ~0.1, which is on the boundary of continuum flow and transition flow. To a good approximation, the flow of particles will act as a continuous medium, with the flow pattern established by the granule-granule interactions.

Another feature is that the flow pattern established by the granules is determined by the Reynold's number Re (which assumes a continuum flow), and in a proposed design for an example embodiment the granule flow has Re—200, which corresponds to a laminar flow. That is, the flow pattern is preferably not turbulent, or in the transition region of turbulence. On the other hand, the Reynold's number for the gas flow is of order $3*10^5$, which is turbulent. A laminar flow is a signature of "granular flow".

Another feature is that the granule mass loading should preferably exceed the gas mass loading (taking into account the gas produced by the reaction). This means that the particle flow will not be dominated by the gas flow—so that the particles are not carried along as individual particles by the gas flow, and exhausted from the reactor before the reaction is complete. If the gas mass loading is too small, then the granules flowing in a tube would tend to "salt" out and collect at the bottom of the tube. Saltation is a result of the collective granule motion. The Helix system in the example embodiments establishes a regime in which the granules move at the saltation velocity through the Helix, which is about ~20% of the gas velocity in the present design. The balance of the forces is preferably such that the particles remain suspended in the Helix despite the velocity mismatch (no clumping). A single particle (ie no collective motion) would be swept through the Helix at about the gas velocity, and would not have a sufficiently long residence time to allow the calcination to proceed.

The superheated steam pressure is maintained at a slight positive gauge, so that there is minimal air entrainment and minimal superheated steam loss through the system. Typically, the steam injection pressure at the injector 16 is in the range of 1-2 bar, and the pressure at the exhaust 21 is in the range of 0.2-0.5 bar (as a result of the gas-granule friction).

The exhaust 21 is pumped by the effect of a heat exchanger, condenser or mechanical pump 29 or a combination of these, such that the exhaust gas pressure rises to >1 bar absolute to exclude an influx or air into the system at the exhaust. Alternatively, the steam pressure at the injection can be raised such that the pressure at the exhaust exceeds 1 bar absolute. The superheated steam pressure at the mixer 14 is larger than that at the injector 16, to provide the pressure required to raise the feedstock through the reactor 10 by the pneumatic conveyor 15.

The gas pressures in the reactor 10 impact on the efficiency in several ways. Firstly, it is advantageous for the pressure at the injector 16, where the gas is steam, to be relatively high such that the catalytic action of the steam is optimized and that the pressure is sufficient to help maintain the flow of granules and gases in the helix 18. Secondly, in order to further minimise the deleterious effect of the back reaction, the pressure of the gas near the exhaust 21 should preferably be relatively low so as to minimise the effect of the back reaction. The high gas-granule friction induced by the centrifugal forces of the granules causes a pressure drop in the reactor 10 such that this beneficial pressure profile can be maximized.

The gas-granule separator 19 preferably has not only a high collection efficiency of the granules, but also collects the smaller granules produced by decrepitation. Typically, this system will have about 100% efficiency for all granules larger than about 5 microns.

The flow rates of the superheated steam are set so as to maximise the degree of calcination. In FIG. 1, the steam moves in the same direction as the granules, so that the steam has maximum impact on the reaction rate at the top of the reactor 10, and this effect decreases through the reactor 10 as the steam is diluted by the reaction gases and the pressure drops as a result of the friction along the tube 17.

Figure 2:
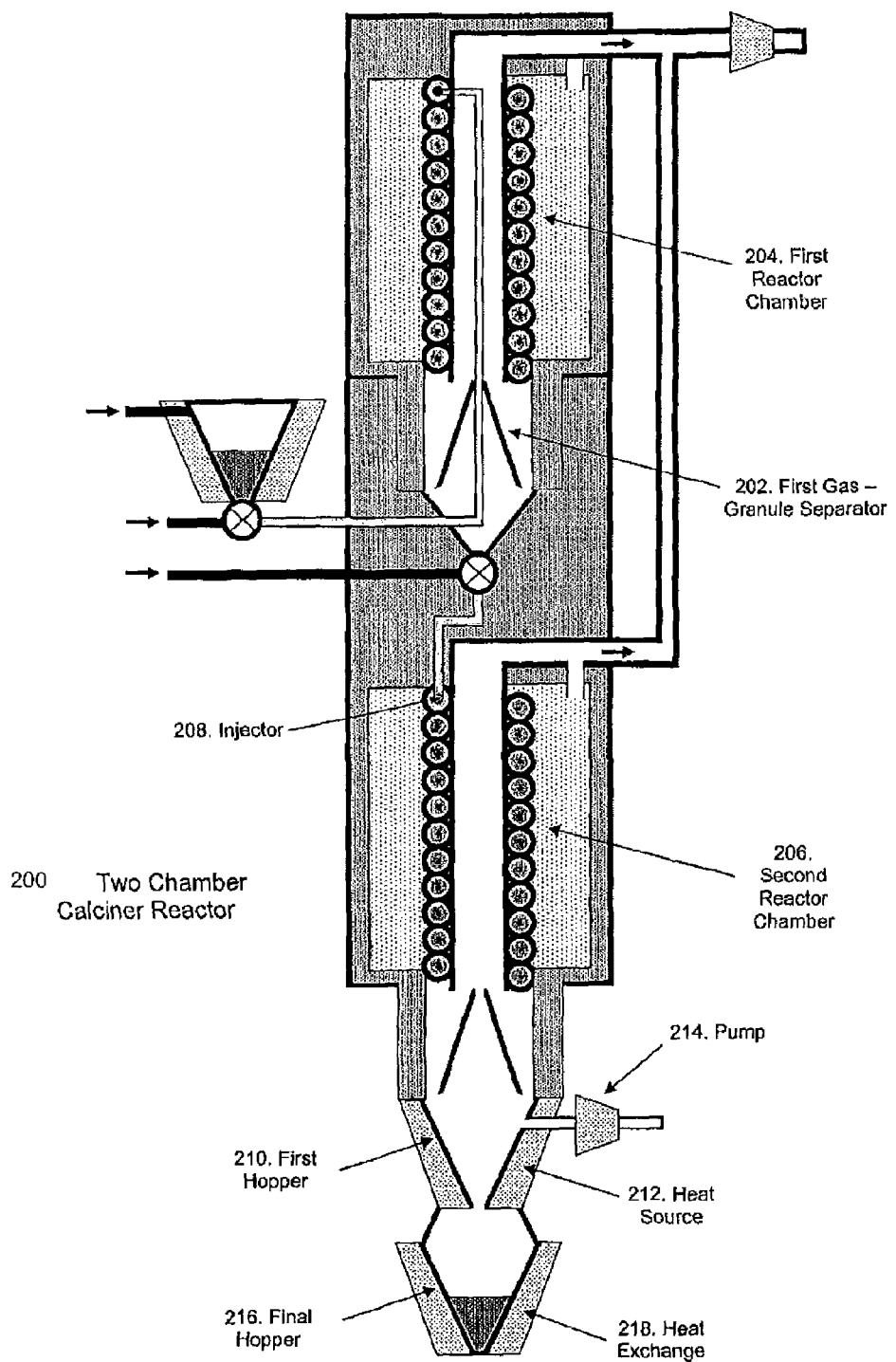
FIG. 2 shows a schematic cross-sectional drawing of a two stage calciner reactor according to an example embodiment.

Under conditions where the effect of the back reaction may be such that the reactor calcines the material to, say, 50% completion, a multi-stage reactor system may be used in a different example embodiment. With reference to FIG. 2, in a two stage reactor system 200, the granules, having been separated from the steam and the reaction gases at a first separator 202 of a first reactor chamber 204, are injected into a second stage reactor chamber 206, with fresh superheated steam injected at injector 208, where the reaction proceeds to, say, 90% completion in the second reactor chamber 206. It is well established that the rate of the calcination reaction decreases as conversion increases because the reaction zone, deep within the granule, decreases in surface area. This is compensated in this reactor design by increasing the temperature near the exit of the granules. In some cases, a final degree of reaction to about 98% can be achieved by heating the granules in a first hopper 210 to act as a trimming reactor using heat source 212, and pumping the first hopper 210 with mechanical pump 214 such that the back reaction is suppressed. The residence time in this trimmer should be kept as low as possible to reduce the effect of sintering. This also emphasizes the importance of preferably being able to control the temperature distribution along the reactor. The product granules are then collected in a final hopper 216, and are rapidly cooled using heat exchanger 218.

Returning to FIG. 1, preheating of the feedstock 11 in the hopper 12 by a heat exchanger 27 and the injection of some superheated steam 28 can remove air entrained in the feedstock 11. Thus the exhaust gas 21 comprises principally the reaction gas, typically carbon dioxide, as well as the superheated steam. The condenser 29 removes the superheated steam from the gas, scrubs the gas to remove entrained dust and noxious sulphur containing gases emitted from the feedstock 11, and pumps the exhaust gas 21. Alternatively, the dust is removed and bagged before the condenser. The residual gas is substantially pure carbon dioxide which can be compressed and stored for use, including carbon capture processes such as sequestration.

This process implemented in the described embodiment obviates the high cost typically associated with processes of separation of carbon dioxide from a conventional combustion-based calciner, which contains nitrogen, unburnt oxygen and superheated steam. This carbon capture feature gives this calcination process one of its preferable differentiating features compared to conventional calcination. The costs of subsequent steps, such as compression and sequestration are common to most carbon capture approaches.

The temperature of the granules during such transportation is preferably kept sufficiently low to ensure that both the steam catalysed calcination reaction and the sintering by steam heat is minimised, and the adsorption of steam maximised, while the steam temperature is preferably kept sufficiently high so that the steam does not condense.

The temperature of the calciner walls is maintained at the desired calcination temperature by heating the outer wall of the reactor tube 17. When multiple reactor chambers are used, the average temperatures for each chamber may be different and each chamber may operate with a temperature gradient. There are several means of achieving the external heating, with the design of external heating systems being a known art. The helix 18 provides a large external surface area, and the control of the temperature can provide the system with a uniform thermal load. It is preferable that the thermal load be less than about 50 kW $m_{-2}$. Where distributed flameless heating is used, the suppression of pyrolysis can be achieved by feeding a portion of the calciner exhaust into the fuel in the external heating system 24 via a pipe connection 31 coupled to the exhaust 21, to control the rate of production of heat.

For example, it is often desirable that the temperature near the base of the calciner reactor 10 is larger than that at the top. Near the injector 16, the $CO_2$ partial pressure is small, and the reaction rate is faster than at the base, so that for a constant thermal load, the temperature at the top can be lower than the base. This can be achieved by injection of the fuel near the base, so that the flow of gas in the external heater system 24 is in counterflow to the flow of gas and solids in the tube 17. In another such example system, the heat is produced electrically by applying a voltage between an upper portion and a lower portion of the tube 17 with a current supplied to heat the reactor tube 17 by its electrical resistivity. In another example system, the heat is produced by burners arrayed around the external surface of the tube 17 so as to produce the desired temperature distribution along the reactor tube 17. In another example system, the heat is provided by a heat exchanger from a heat exchange fluid, such as compressed carbon dioxide. In another example, oxygen is used instead of air. A combination of such systems may be used.

The reactor tube 17 is illustrated as a tube with circular cross section. However, other shapes may be used. For example, a tube with a square or rectangular cross section has a larger surface area for the same cross-section, and provides a greater ease of joining the windings of the helix together so as to produce a leak free central column 20. If the helix 18 is formed by bending a structure, then the cross section of the bent shape will generally be deformed. Such structures have a higher heat transfer coefficient not only because of the higher area, but also because the gases in particular have increased turbulence, hence heat transfer. A high bending radius to pipe diameter ratio is preferred, but the design can accommodate a ratio which allows for hot or cold bending of standard pipes. Alternatively, where porous material is used in the implementation of the heating system 24, the tube or tubes can be cast into the porous material. Similarly, one or more of the gas-particle reactor, the central column, and the conveyer 15 can be cast into the porous material.

The mass of the reactor 10 is relatively small, so that its thermal response time is fast compared to existing calciners. The mass is principally determined by the tube 17 length and thickness. While the tube 17 thickness preferably is as small as possible, preferably is sufficiently thick that the attrition caused by the interaction with the granules can be tolerated. Thus the process conditions can be adjusted almost instantaneously to meet variations in the feedstock 11, such as variations in surface area and porosity, or the calcined product specifications. The short residence time allows for measurement of the products to be fed back to the process parameters to maintain the specified product specifications in response to variations in the feedstock 11 and other parameters. This can manifest itself by relaxing the specifications of the rocks, and adds a tolerance for variability in the rooks acceptable for calcination. To assist in such control, measurement systems such as x-ray analysis systems may be used to measure properties of the calcined products in real time, and the $CO_2$ produced can be used to monitor the overall calciner operations. This rapid response feature exemplifies the flexibility of the described embodiment to deaf with practical issues in minerals processing.

Another preferred attribute of the tube 17 material is that it preferably has as high an emissivity as possible because one of the major contributors to the heat transfer is radiative heating. For radiative heating to be dominant, the emissivity of the granules is preferably also high. Most carbonate minerals have a high emissivity.

The reactor 10 can be held in a standby condition in which the feedstock 11 is turned off, and the superheated steam 13 flow reduced. The stationary feedstock 11 in the hopper 12 can be maintained at a sufficiently high temperature by the heat exchanger (not shown) to allow for a fast restart process from this standby mode. The standby capability allows the reactor 10 to be cleaned and inspected with minimal downtime. When used with a number of reactors as described below in e.g. multi-throat calciner module, this capability allows for any combination of reactors to be operational, and the others in standby or turned off.

In the described embodiment the superheated steam flow rates and the temperature of the superheated steam in each reactor segment, and the superheated steam pressure, can be used to trim the performance of the reactor to provide the desired degree of conversion.

With respect to energy management, the described reactor is a recuperative design in which the heat contained in the gases at the top of the reactor 10 and the heat extracted from the calcined feedstock at hopper 23 is used to heat the feedstock 11, dry the rocks and heat the water for the boilers etc. The management of heat in such systems is understood in the art to achieve the maximum efficiency. The heating of the feedstock 11 by the exhaust gases is practiced in existing calciners, while the desirable operating conditions of the condenser and the compressor, the means of drying, crushing and grinding the rocks to feedstock, and operation of the superheater for maximum efficiency are understood industrial processes, that, when practiced, enable the described reactor to operate at a thermal efficiency comparable to or better than conventional calciners. For a comparable product of ground calcined material, the only step that has a marginally higher energy cost than that of existing calciners is that of crushing the feedstock because the energy cost per tonne of product is higher, at about 0.2 GJ tonne$^{-1}$ because of the mass reduction after calcination. The energy expended by the steam to drive the granules up to the Injector 16, through the helix 18, and the heat exchangers is relatively small.

The flexibility of the described reactor design is such that the operation can be matched to adapt to the availability of energy sources. For example, the energy for the heat exchange fluid and the superheated steam can be supplied from other sources including, but not limited to, that from power stations that use steam for the turbines, and from solar concentrators that generate high pressure steam at various temperatures, some in excess of 600° C., depending on the means of solar collection, and geothermal steam. These sources can be used, as well as electrical power, combustion of coal and gas etc depending on availability, price and environmental impact. There is an increasing requirement for industrial processes to be adaptable to suit the local conditions in which such a plant operates, including access to sources of energy, and the described design meets that requirement.

The height of the calciner reactor 10 can be for example about 9-40 meters, to provide a sufficient residence time for the granules to react to the desired degree (say 98%) under the conditions of feedstock and superheated steam feed rates, their temperatures, etc. This total reactor length can be separated into reactor segments and associated gas granule separators if required and as described above. The calcined product has a high reactivity because the residence time is sufficiently short and the calcination temperature sufficiently low that the annealing process, which occurs in most calciners, does not have time to progress. That is, the product is highly reactive. The calciner reactor 10 is surrounded by a thermal insulation 25. The thickness of the insulation and the insulation efficiency are chosen such that the loss of heat to air is minimised. Radiation baffles can also be deployed. The calciner reactor 10 or parts thereof can also be vibrated or rotated so as to eliminate the build-up of granules on surfaces, utilising understood mechanisms provided by a vibration or rotation unit 35 coupled to the calciner reactor 10.

The efficiency of the reactor 10 preferably relies, inter alia, on one or more of:—

(a) the use of steam to catalyse the reaction so that the reaction can be complete within one pass;

(b) the use of steam to inject the granules into the reactor 10 and move the granules through the reactor (and later assisted by the reaction gasses);

(c) the use of a reactor tube 17 (selected from a diversity of shapes) with a diameter such that the exhaust velocity of the gases is between 20 and 50 m s$^{-1}$.

(d) the use of a helix 18 of the reactor tube 17 to limit the acceleration of the granules through the reactor 10 by the gas to provide a compact reactor system with the desired granule residence time, a rapid heat transfer between the granules and the gas, and a high surface area for heat transfer to the granules;

(e) the use of the helix 18 to provide the centrifugal motion that facilitates the separation of the granules from the gases at the gas-granule separator 19.

(f) The use of the helix 18 to induce a pressure drop through the reactor 10 such that the steam injection pressure at the injector 16 is high so as to promote the catalytic action of steam, and the pressure of the gas at the exit 21 is low so as to limit the partial pressure of the carbon dioxide and suppress the effect of the back reaction;

(g) the separation of the gases from the granules at a number of stages during the reaction using reactor segments in series so as to reduce the effect of the back reaction, allowing a reduction in the calciner temperature.

(h) the co-flow arrangement of the gas and granules within the reactor 10 to support a stable reactor system (i) a counterflow of the combustion gases in the external heating system 24 to the gas and granule flow in the tube 17 to achieve the desired temperature distribution in the calciner reactor 10.

(j) The injection of a fraction of the calciner gas output into the external heating system 24 to limit the production of carbon in the combustion process.

(k) The use of oxygen instead of air as a combustion gas, or the use of a ceramic within the external heating system to separate the nitrogen and oxygen.

The operation of the calciner reactor 10 can be understood by the example of limestone calcination, for which the important thermodynamic and kinetic data are available. Khinast et al, Chem Eng Sci, 51, 623-634 (1996), studied the calcination reaction for granules of diameter d<100 micron at 780° C., without superheated steam. They found that the irreversible reaction rate for a surface area of S(x) depends on $CO_2$ partial pressure p (with total pressure of 1 atm) was modelled by the equation:

$$k_A(x) = 2.02 \times 10^{-7} S(x) \exp(-11.92 p/p_o) s^{-1}$$

where $p_o$ is the equilibrium carbon dioxide pressure determined from the known equilibrium constant $K_p = (1-x)/x \, p/p_o$ where x is the degree of conversion of the feedstock. The granule surface area S(x) evolves during the reaction, and Khinast et al demonstrated that their results could be modelled by a random pore distribution that evolves as:

$$S(x) = S_O (1-x)^{1.7} (1-37 \ln(1-x))^{0.89} m^2 kmol^{-1}$$

where $S_O$ is the BET surface area in $m^2$/kmol. For limestone, $S_O$ is ~$2.10^5$ $m^2$ $kmol^{-1}$. The reaction time, $k_A(0)^{-1}$, without superheated steam catalysis, is 50 sec at 780° C. with p=0 (ie the quenching being suppressed by a low carbon dioxide concentration), whereas the residence time in a conventional kiln is many hours.

The exponential reduction of the forward reaction rate with p demonstrates that the forward rate is rapidly quenched by carbon dioxide. It is this large effect that presents a challenge in calcination of carbonates generally, especially when the carbonate materials are surrounded by carbon dioxide from the combustion gases. This requires the calciners to operate at high temperatures so that $p_o > p$.

The chemical process for calcination will generally follow an Arrhenius form given by:

$$k_A(x, T) = k_o(x) \exp(-E_A/RT) s^{-1}$$

where $E_A$ is the activation energy and R is the gas constant. The activation energy $E_A$ was determined by Wang and Thompson, Chem Eng Sci, 50, 1373-1382 (1995) to be 197 kJ mol$^{-1}$ and by Beruto and Searcy, J. Chem. Soc. Faraday Trans 70, 2145-2153 (1974) to be 205 kJ mol$^{31}$ 1. These compare with the enthalpy of reaction of 168 kJ mol$^{-1}$.

The presence of superheated steam as a catalyst provides an alternative pathway for the reaction, Wang and Thompson used very small granules (~1μ), so that the impact of the mass transport processes was minimised. They considered partial pressures of superheated steam <0.2 atm, and carbon dioxide at <0.0008 atm, and studied the process in the range from 440° C. to 560° C. They experimentally showed that the catalytic effect of the superheated steam arises from the adsorption of water molecules on the surface as the first step, which induced a weakening of the bonding of the carbon dioxide to the calcium by the adsorbed water molecules as the second step. The adsorption of water followed the equilibrium constant $K_{ads}$ with a binding energy $\Delta H_{ads}$ of 1.5 kJ mol$^{-1}$. They observed that the reaction rate is increased significantly as the partial pressure of superheated steam is increased, and they modelled this behaviour using the Langmuir-Hinshelwood model of surface catalysis, with $$k_{catalysis} = k_A + (k_B - k_A) K_{ads} p_x / (1 + K_{ads} p_x)$$

where $p_x$ is the partial pressure of superheated steam. At low superheated steam pressures, the uncatalysed reaction rate $k_A$ dominates, whereas at sufficiently. high superheated steam pressures where $K_{ads} p_x \gg 1$ the catalysed reaction rate $k_B$ dominates. Wang and Thompson measured an activation energy $E_B$ for the rate constant $k_B$ to be 247 kJ mol$^{-1}$, and showed that the catalytic effect becomes relatively more pronounced at higher temperatures (ie $k_B/k_A$ increases with temperature), but the effect is partially reduced at constant superheated steam partial pressure because the binding of the water to the granules is reduced as the temperature increases. They extrapolated their results to higher temperature, and showed that the ratio $k_B/k_A$ increases from 2.0 at 670° C. to 14 at 860° C. The catalysis pathway has higher activation energy than the uncatalysed pathway, but much smaller activation entropy, which means a simpler reaction path. The results of Wang and Thompson can be extended to larger granules by assuming that the function $S(\alpha)$ applies to both $k_B$ and $k_A$. That is, the evolution of the pores is the same in both processes.

The inventors have recognised that, based on the experimented findings in the respective works mentioned above, the reaction rate can be reduced to seconds when calcining granules in the presence of superheated steam at temperatures appropriate to calcination. The described embodiment has been developed in light of this recognition by the inventors. In addition, the inventors have observed that the surface area of the granule made using flash calcination exceeds that deduced by the model above (ie by integrating the expression for $S(\alpha)$). Thus, the model rates are a lower bound on the expected rates.

The preferred operating conditions for the described embodiment of the calciner reactor 10 shown in FIG. 1 are listed in Table 1 for substantially pure limestone.

TABLE 1

| Parameter | | Value | Units |
|---|---|---|---|
| Calciner Properties | | | |
| Number of Reactor Segments | N | 2 | |
| Tube Length per segment | L | 24 | M |
| Calciner Diameter | D | 0.30 | M |
| Calciner Wall Thickness | δr | 0.0036 | M |
| Helical Diameter | $D_h$ | 0.76 | M |
| Thermal Conductivity | K | 21.5 | W m$^{-1}$ K$^{-1}$ |
| Residence Time | $\tau_{res}$ | <7.5 | S |
| Heat Exchange Temperature | $T_e$ | 984 | ° C. |
| Calciner Gas Pressure-exit | $p_{out}$ | 0.3 | Atm |
| Calciner GasPressure-entrance | $p_{in}$ | 1.4 | Atm |
| Feed Stock Properties | | | |
| Feedstock Rate | $\gamma_A$ | 1.45 | kg s$^{-1}$ |
| Feedstock Mesh Size | $d_A$ | 50-150 | μ |
| Calciner Charge | | 10 | Kg |
| Degree of Reaction | α*☐ | >0.98 | |
| Superheated Steam Properties | | | |
| Injection Rate | $\gamma_{steam}$ | 0.09 kg/s at throat 0.09 kg/s at base | kg/s |

The principles for the described calciner reactor properties can be adequately described by treating the calciner reactor as a uniform reactor in which the heat and mass transfers as described above give an average calcination temperature $T_c$ as the result of the turbulence and the rapid transfer of heat to the feedstock granules. It is noted that a more precise approximation would be to consider the calciner in sections to deal, for example with the need for a higher rate of heat to be supplied at the top of the reactor 10 than at the base, and to set the calcination temperature at each point $T_c(z)$. However, in describing the principles, it will be appreciated that the expressions given below are adequate provided it is understood that $T_c(z)$ is a nominal average value.

In this approximation, the quantities below are averaged over the calciner. The mass and energy balances for the calciner of FIG. 1 is given by the heat flow dQ/dt $$dQ/dt = UA(T_e - T_c) - \gamma_A \alpha \Delta H_{calc}(T_c) + \gamma_A C_{p,reactant}(T_{in} - T_c) + \gamma_{steam} C_{p,steam}(T_e - T_c)$$

In this expression U is the heat transfer coefficient from the external heat exchanger at its (average) temperature $T_e$ to the feedstock granules at the (average) calcination temperature $T_c$, through the calciner surface area A. The injection temperatures of the reactants and superheated steam can be set equal to $T_e$. U is given by the expression $$U = 1/(1/h_e + \delta r/k30 \ 1/h_c)$$

where $h_s$ is the heat transfer coefficient from the external heat fluid in the coils to the outer calciner wall, δr is the wall thickness and k is the heat conductivity of the wall material, and $h_c$ is the heat transfer coefficient from the inner wall to the granules. The coefficient $h_c$ is of particular importance for the process, and is considered below.

In the heat flow equation, the second term contains the heat consumed by the reaction at temperature Tc where $\gamma_A$ is the feedstock rate in kg/s and α* is the extent of the reaction given by $$\alpha^* = 1 - \exp(-<k_{reaction}(T_c)>*\tau_{res})$$

where $<k_{reason}(T_c)>$ is the nominal average rate of reaction, and $\tau_{res}$ is the residence time of reactants in the calciner, and $\Delta H_{calc}$ is the enthalpy of reaction in J kg$^{-1}$. The third term is the heat change of the reactants which enter calciner at temperature $T_{in}$, and are mixed to the reaction temperature $T_c$. The fourth term is the heat change of the superheated steam which is injected at a rate of $\gamma_{steam}$ at temperature $T_s$ and exits at the temperature $T_c$.

The average calciner temperature at steady state, $T_c$, is the temperature at which dQ/dt=0.

While this approximate model is useful for teaching the principles of the described calciner 10, it does not take into account some important properties of the described embodiment. Firstly, the temperature in the reactor 10 $T_c(z)$ varies strongly along the vertical axis in response to the limited heat transfer rate through the calciner walls. Secondly, the gas pressure in the reactor 10 is maintained at the nominal superheated steam pressure $p_s$ by regulating the flow of gasses from the exhaust 30. The carbon dioxide produced in the reaction increases the flow rate of the mixed gases through the reactor 10 to retain this total pressure, but the partial pressure varies along the reactor 10. Thus at the injector 16 the gas is largely superheated steam at pressure $p_{in}$, while at the exhaust 21 the gas is a mixture of superheated steam and the released carbon dioxide, also at $p_s$. This affects the quenching of the reaction, and thus the yield.

If the smaller contributions arising from the temperature differentials of the feedstock and the superheated steam are neglected, the calciner operating condition is given by $$UA(T_e-T_c)=\gamma\alpha^*\Delta H_{calc}(T_c)$$

For complete reaction, $$<k_{reaction}(T_c)>^*\tau_{res}>>1, \text{ so that } \alpha\approx1.$$

This approximation essentially sets the parameters of the design of the heat exchange between the heat exchange fluid and the feedstock granules.

The heat transfer is considered for the Calciner of Table 1 based on two segments of a form shown in FIG. 1. A 24 m long tube with a diameter of 0.30 m is formed as a helix with a centre-to-centre diameter of 0.76 m with 10 turns. When used to calcine limestone with feedstock rates at 1.45 kg s$^{-1}$, 2.6 MW of heat is required for the reaction, and this is provided through the outer surface of 25 m$^2$ exposed to the heat source. This corresponds to a heat transfer efficiency of about 100 kW m$^{-2}$.

In the described embodiment, essentially pure carbon dioxide is produced at the rate of 0.44 tonnes of carbon dioxide per tonne of limestone, based on the parameters listed in Table 1 above. In a conventional calciner heated by the combustion of LPG in air, there would be 0.65 tonnes of carbon dioxide produced per tonne of limestone. This would be mixed with 0.5 tonnes of nitrogen from the air required for the combustion, to give a partial pressure which is, at most, only 45% carbon dioxide. In conventional calciners, this is released to the environment, and contributes to global warming. The 'post-combustion' separation of these gases is of considerable interest in the reduction of carbon dioxide emissions, but the costs using current technologies are so high that it is impractical to do so.

In contrast, in the described embodiment the carbon dioxide is produced in essentially pure form, and this separation step is not required. Even if combustion was used to supply the heat for the calcination reaction and the 0.22 tonnes of carbon dioxide per tonne of limestone processed is released, the compression and geosequestration of the remaining 0.44 tonnes would result in the reduction of carbon dioxide emissions from calcination by 68%.

It will be appreciated that the weight of the calciner reactor 10 as described in the embodiment with reference to FIG. 1 is much smaller in volume and weight than a conventional kiln of the same throughput because the residence time of 1-10 seconds is several orders of magnitude shorter than that of a conventional calciner. Thus the weight of material being treated in the calciner is of the order of kilograms compared to hundreds of tonnes. The figure of merit of the calciner reactor 10 would be about 1600 tonne/hr/tonne of charge, compared with a conventional calciner of about 0.2 tonne/hr/tonne of charge.

The thermal efficiencies of the described calciner reactor 10 depend principally on the efficiencies associated with the recuperation of heat from the products and exhaust gases to the feedstock and the heat exchange fluid, as well as heat losses from the calciner reactor surfaces. Such recuperation is largely independent of the calcination process and best practice can be applied, whereas the surface losses scale with the relative surface areas of the calciners. The cost of mediation of the surface heat losses scales with the calciner surface area. The calciner reactor 10 of the described embodiment also has an advantage in terms of costs of maintaining thermal efficiency. In a conventional calciner, the insulation material is placed on the inside of the kiln, is very expensive, and is subject to significant attrition requiring frequent relining of the kiln, often after a catastrophic failure of the lining. By comparison, the surface attrition in the described embodiment is negligible, and the inner surface of the tube 17 can be stainless steel, and the thermal insulator 26 is placed on the outside of the reactor 10 where it is not subject to attrition or chemical attack. further details of the insulation are dismissed below.

In the described embodiment, the rocks are crushed before calcination, whereas, for an equivalent product from a conventional calciner, the processed material is crushed after calcination, when the mass of the rocks has been significantly reduced by the calcination reaction. In situations where the hardness of the rocks and the calcined products are similar, as is generally the case, there is a net cost of energy because the energy expended on grinding scales primarily with mass. Crushing and grinding is understood in the art, and the energy cost per tonne of grinding materials such as limestone to the mesh sizes used in this invention is about 0.3-0.4 GJ tonne$^{-1}$. For limestone, the change of mass is 45%, and the energy penalty is consequently 0.15-0.2 GJ tonne$^{-1}$ of rocks. The energy to crush the materials is, however, dependent on the feedstock and the degree of burning of the calcined material, such that these are estimates only. This penalty has to be assessed against the irreducible heat of reaction of 3.18 GJ tonne$^{-1}$ for lime, and the typical thermal losses of 0.4 GJ tonne$^{-1}$. It will be evident to people skilled in the art that this penalty is marginal, and can be offset by the demonstrable benefits described above.

The analysis above is based on figures of merit derived by comparing the described embodiment with conventional calciners. This is meaningful for comparison if the processes described herein are to give comparable throughputs to those of conventional calciners. Conventional calciners can have a throughput of about 30 tonnes hr$^{-1}$, but more typically it is about 20 tonnes hr$^{-1}$.

It will be appreciated by a person skilled in the art that embodiments of the type described herein can be scaled to match or exceed the throughputs of conventional calciners through appropriate design parameter choice based on a theoretical analysis of the underlying processes, and in conjunction experimental or operational processing results.

Existing calciners are large and heavy systems that are not amenable to a module approach as the one described above with reference to FIG. 2 for an example embodiment of the present invention. Existing calciners require periodic relining of the calciner, which is an expensive and time consuming process. In contrast, the module approach allows routine maintenance and inspection to occur from Module to module with minimum disruption to the overall production, as well as from reactor to reactor through the stand-by/on-off capability. Also, the calciner modules of such examples embodiments can be relocated, eg to new mining sites, to meet immediate demands and opportunities.

The calciner reactor 10 described in FIG. 1 is more generally applicable to calcining minerals other than limestone. A broad statement is that calcination is the chemical process that is activated by heat, and includes dehydration as well as decarbonation, with or without superheated steam. Starting materials are generally carbonates, but hydroxides also calcine to oxides, and hydrated materials are dehydrated. In many chemical reactions (other than dehydration), superheated steam is quite likely to assist most such processes because the water molecule is a well established labile ligand to mostly all metal ions, and therefore chemical intermediates involving water may be engendered by the presence of superheated steam. Even where the catalysis does not occur, there may be advantages in using the process of the described embodiments in which the role of superheated steam, or other injected gases, is principally to promote the transfer of heat to the granules. That is, generally, the fine grinding of feedstock will remove the impact of heat transfer and mass transfer process of decomposition, and enhance the chemical reaction step. The operating conditions of the calciner reactor 10 described can be readily adapted to any calcination process in which the calcination can be accommodated within the residence time of feedstock passing through the system.

The described embodiments can be applied to the processing of magnesite, dolomite and limestone with the following process conditions principally related to the calcination temperature.

When the calcination temperature is set between about 850° C. to 960° C. for a feedstock injection rate of about 1.4 kg s$^{-1}$, with the gas pressure maintained at between about 0.2-3 atm and a superheated steam injection rate of between about 0.5 to 0.05 kg s$^{-1}$, limestone/calcite ($CaCO_3$) calcines to lime (CaO), and dolomite ($CaCO_3 \cdot MgCO_3$) calcines to the fully calcined product CaO.MgO and magnesite ($MgCO_3$) calcines to magnesium oxide (MgO). The temperature requirement is determined by quenching of the calcination rate by carbon dioxide.

When the external temperature of the reactor is maintained at about 500-650° C., for a feedstock injection rate of about 1.4 kg s$^{-1}$ and a gas pressure maintained at between about 0.2-3 atm and a superheated steam injection rate of between about 0.5 to 0.05 kg s$^{-1}$, magnesite and dolomite are calcined.

When the calcination temperature is set between about 450° C. to 550° C., limestone is not calcined and magnesite calcines to magnesium oxide.

For calcining hydrated materials, the external temperature of the reactor is maintained at about 200-400° C. for a feedstock injection rate of about 1 kg s$^{-1}$, the gas pressure is maintained at between about 0.2-3 atm, and a dry unreactive gas injection rate is between about 0.5 to 0.05 kg s$^{-1}$.

The range of temperatures accounts for the presence of encapsulated impurities, such as silica, in the rocks that generally increase the preferred calcination temperature above that of pure rocks.

Just as for the processing of limestone, the calcining temperature for processing of magnesite is some 50° C. lower that that used for conventional calcination. The catalytic action of superheated steam is a more general property for calcining materials.

It is understood that the composition of minerals varies depending not only on the area of a site being mined, but also in different geologic regions. To confirm the sufficiency of a short residence time under superheated steam catalysis (i.e. of the order of 1 to 10 seconds),a test calciner was constructed for batch processing. Batches of granules between 0.2 to 2 kg were weighed and then calcined in a single pass with a residence time of about 3 seconds under the superheated steam Catalysis conditions for each batch. Magnesite ore sourced from China which was assayed to be 97% $MgCO_3$ was ground to an average size of 125 microns and a sieve with a mesh size of 230 micron was used to remove oversized granules from the distribution and to prepare charges of 700 gm. The available carbon dioxide from this charge was 354 gm. The test runs were conducted with 1 atm of superheated steam at 485° C., and an average reactor chamber wall temperature of 484° C. From the measured weight loss, the conversion was calculated. The loss of carbon dioxide was confirmed by chemical analysis. A conversion for magnesite to magnesia of up to 97% was obtained in those tests.

The reactivity of the materials produced by superheated steam calcination in the described reactor 10 very high as evidenced by the rate of hydration of the product compared to materials produced by conventional means. This is because the material loses its weight more rapidly than the structure can sinter to lower its free surface energy. Thus, in several seconds transit through the reactor 10, the feedstock 11 mass is greatly depleted and there is a build-up of pressure in any areas of the granule that would otherwise tend to seal over, as evidenced by the decrepitation of the material that can result. Thus the materials have a very high surface area, and thus a high reactivity. In some cases the reactivity is further increased by the presence of chemical defects in the material which form reaction centres. That is, the rapid calcination produces materials with more defect centres as well as a high surface area compared to conventional calcination. If a lesser reactive material is required, it is known that the materials can be sintered quickly in an atmosphere of carbon dioxide and superheated steam at high temperature. In very demanding reactions, such as regenerable sorption, it is known that a super-sorbent can be formed by fabricating materials that have a high mesoporous surface area. Mesopores are less prone to pore-clogging compared to micropores, and so the efficiency of the fast sorption is increased. For example, calcined limestone granules have a 30% recarbonation yield compared to about 90% for a mesoporous material. The materials produced by the described reactor 10 are generally mesoporous. and act as super-sorbents.

Figure 3:
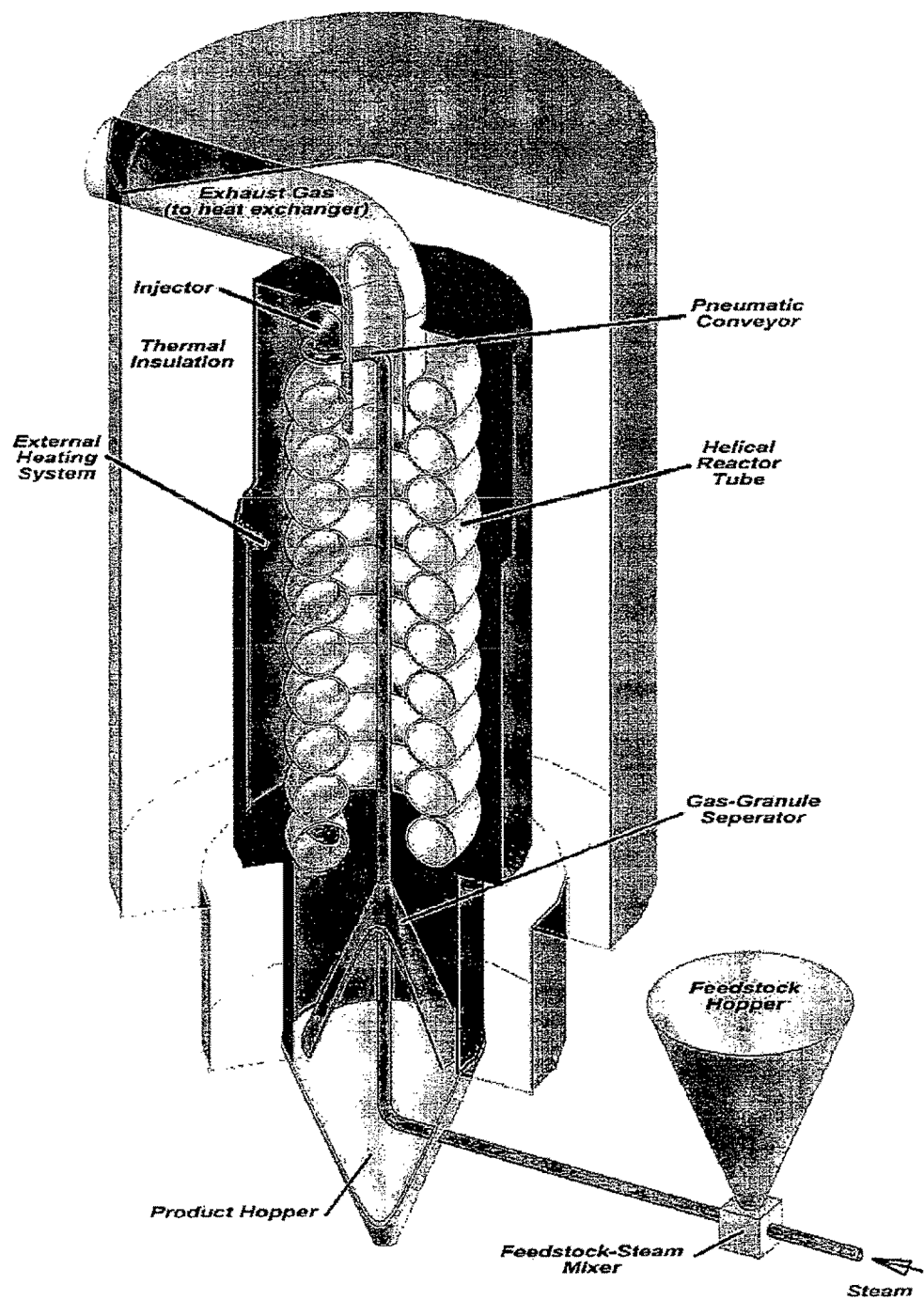
FIG. 3 shows a CAD drawing of an isometric cut-away view of a calciner reactor according to an example embodiment.

FIG. 3 shows a CAD drawing of an isometric cross-sectional view of a calciner reactor 300 according to an example embodiment.

Figure 4:
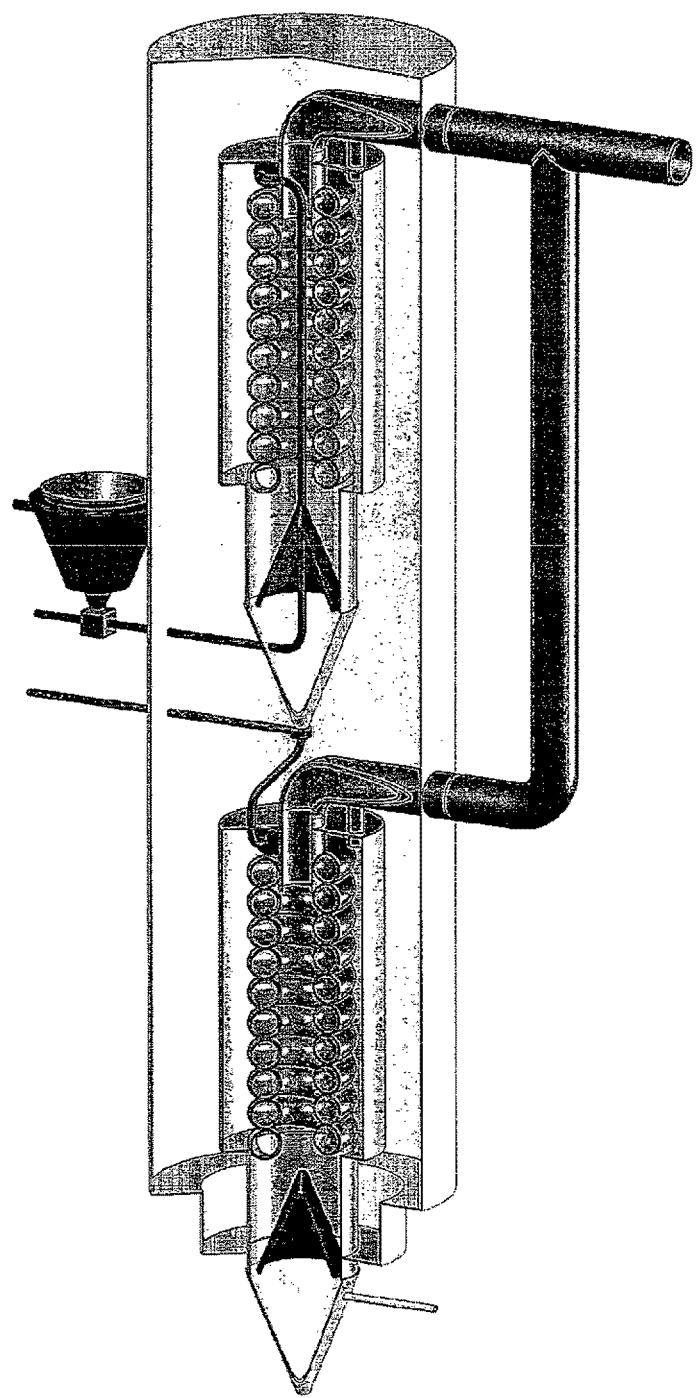
FIG. 4 shows a CAD drawings of an isometric cut-away view of a two stage calciner reactor according to an example embodiment.

FIG. 4 shows a CAD drawings of an isometric cross-sectional view of a two stage calciner reactor 400 according to an example embodiment.

Figure 5:
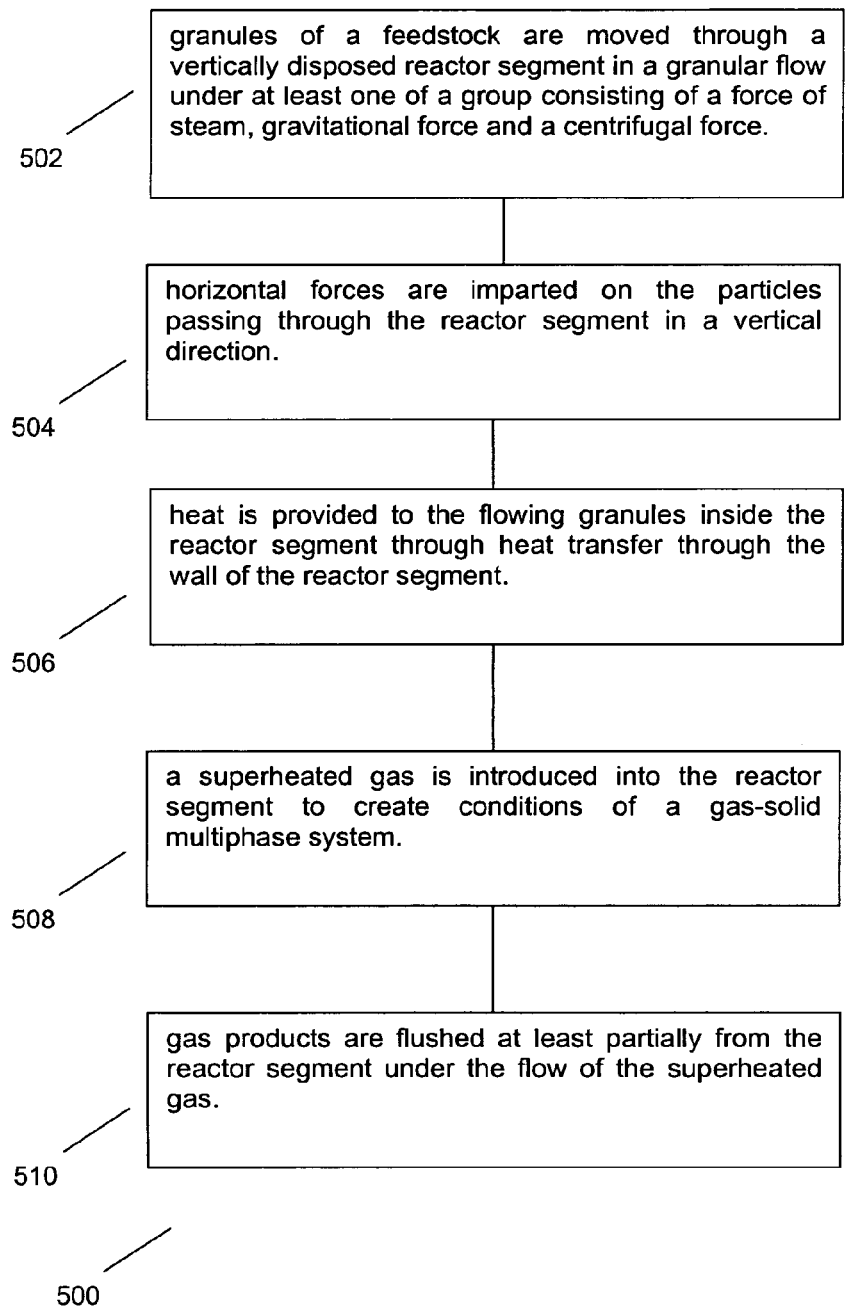
FIG. 5 shows a flowchart illustrating a method for the calcination of minerals according to an example embodiment.

FIG. 5 shows a flowchart 500 illustrating a method for the calcination of minerals according to an example embodiment. At step 502, granules of a feedstock are moved through a vertically disposed reactor segment in a granular flow under at least one of a group consisting of a force of steam, gravitational force and a centrifugal force. At step 504, horizontal forces are imparted on the particles passing through the reactor segment in a vertical direction. At step 506, heat is provided to the flowing granules inside the reactor segment through heat transfer through the wall of the reactor segment. At step 508, a superheated gas is introduced into the reactor segment to create conditions of a gas-solid multiphase system. At step 510, gas products are flushed at least partially from the reactor segment under the flow of the superheated gas.

The described process/method and apparatus for calcining has many advantages including:

Substantially reducing the emissions of carbon dioxide from calcination of carbonates compared to conventional calciners by producing essentially pure carbon dioxide from the calcination step, enabling a cost effective means to increase carbon capture for at least about 68% of the total emissions produced using conventional fuels such as LPG for combustion. This substantially pure carbon dioxide can be compressed and used in other industrial processes, or permanently captured by sequestration, without the need for the expensive process step of separation of gases as would be required for carbon capture from conventional calciners. Further, the calcination process can use heat generated from a diversity of sources other than combustion, including the use of steam generated from a solar concentrator or a power plant. In principle, the process could operate with zero carbon dioxide emissions by the combination of using alternative energy sources for heat and sequestration of the pure carbon dioxide produced by calcination.

Reducing the residence time for feedstock in the calciner to the order of seconds compared to hours for the conventional calciner operating at about 1000° C., through a reactor in which transit time of an average feedstock granule through the reactor is several seconds as a result of the granular flow, and the use of superheated steam as a catalyst and finely ground feedstock that increases the rate of reaction so that the calcination reaction takes place to the desired degree within this transit time. This reduces the size and capital cost of a calciner.

Reducing the deleterious effect of the quenching of the reaction by carbon dioxide when calcining carbonates, that limits conventional calciners which are heated by combustion within the kiln, by separating the processes of heat generation from calcination by using an external heat source, and making use of the efficient heat transfer to the feedstock granules that results from direct radiative heating of the granules, and indirect heating of the turbulent flow of the gas at the calciner surface and efficient heat transfer from the gas to the granule by virtue of the friction of the granular flow with the gas.

Reducing the calcination temperature from that required by conventional calciners, as shown by the calcining of limestone at about 925° C. compared to 960-1100° C. for most calciners, by taking advantage of the fast reaction rate and by flushing the carbon dioxide from the calciner by the superheated steam and separators.

Reducing the response time of the calciner so it is the order of seconds to minutes, so that the process conditions can be adjusted almost instantaneously to meet variations in the Feedstock, or the calcined product specifications; and to allow a standby mode from which processing can commence almost instantly, and to allow a fast turn-on and turn-off of the system with minimal delays and losses of Feedstock. The latter losses would be the order of kilograms, compared to such times in a conventional calciner in which the timescales are hours and the losses of product is tens of tonnes.

Producing highly reactive calcined products by use of a calciner design in which the residence time is short compared to the time to induce annealing of the products, compared to conventional calciners in which the product reactivity is reduced by the annealing of the products because of the longer residence time. The method can e.g. produce lime super-sorbents from limestone and magnesite super-sorbents from magnesia in a single step.

Exhibiting small attrition of the calciner walls by operating under a condition in which the volume fraction of Feedstock in the reactor is small such that the attrition mechanism of conventional calciners from the load is not applicable.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A system for the calcination of minerals, the system comprising:
    a vertically disposed reactor segment configured to impart horizontal forces on particles passing through the reactor chamber in a vertical direction;
    an injector unit for receiving granular feedstock, the injector unit being disposed at a top portion of the reactor segment, whereby granules of the feedstock move through the reactor segment in a granular flow under at least one of a group consisting of a force of steam, gravitational force and a centrifugal force;
    a reactor heat exchange unit thermally coupled to a wall of the reactor segment for providing heat to the flowing granules inside the reactor segment through heat transfer through the wall of the reactor chamber;
    one or more inlets formed in the reactor segment for introducing a superheated steam into the reactor segment to create conditions of a gas-solid multiphase system; and
    one or more exhaust openings formed in the reactor segment such that gas products of the calcination are at least partially flushed from the reactor segment under the flow of the superheated steam from the inlets to the exhaust openings as a mixture of the superheated steam and gas products.

2. The system as claimed in claim 1, wherein the reactor segment comprises one or more reactor chambers, and one or more gas granule separator coupled to the reactor chambers that utilises a vortex formed from the passage of material through the reactor chamber to separate the gas products from the granules.

3. The system as claimed in claim 2, further comprising two or more reactor chambers and respective coupled gas-granule separators connected in series, such that processed material from one reactor chamber collected utilizing the gas-granule separator coupled to said one reactor chamber are fed into another reactor chamber and collected, after further processing in said other reactor chamber, utilizing the gas-granule separator coupled to said other reactor chamber.

4. The system as claimed in claim 3, wherein at least one of the gas-particle separator comprises a heater unit for heating the material collected for providing a trimming reactor functionality.

5. The system as claimed in claim 4, wherein at least the gas-particle separator coupled to said one reactor chamber further comprises a pumping unit for pumping the material collected during said heating for suppressing a back reaction.

6. The system as claimed in claim 1, wherein the reactor segment comprises a plurality of reactor chambers coupled to one particle separator.

7. The system as claimed in claim 1, wherein the reactor heat exchange unit utilizes flameless distributed heating, and at least one of the exhaust openings is coupled to the reactor heat exchange unit for directing a portion of the gas products into fuel for the flameless distributed heating for facilitating suppression of pyrolysis.

8. The system as claimed in claim 1, wherein the reactor segment comprises one or more linear tubes as reactor chambers and one or more gas particle separators, the gas separators imparting the horizontal forces on the particles.

9. The system as claimed in claim 1, wherein the reactor segment comprises one or more spiral tubes respectively formed into a helix as reactor chambers.

10. The system as claimed in claim 9, wherein the exhaust openings comprises a central column formed within an inner circumference of the spiral tube, whereby the system exhibits a counter-flow of the gas products with respect to the granules in the spiral tube.

11. The system as claimed in claim 10, further comprising a conveyer tube coupled to the injector and disposed inside the central column, for conveying the granules from a base of the reactor segment to the injector.

12. The system as claimed in claim 11, wherein the granules are conveyed through the conveyer tube under the force of the superheated steam, whereby the injector functions as the or one of the inlets for introducing the superheated steam into the spiral tube.

13. The system as claimed in claim 11, wherein the reactor heat exchange unit comprises a flameless distributed heating unit, and one or more of a group consisting of the reactor chamber, the gas granule separator, the central column and the conveyer tube are cast in the porous flameless distributed heating unit.

14. The system as claimed in claim 1, wherein a residence time of the granules in the reactor segment is less than 10 seconds.

15. The system as claimed in claim 1, wherein the granules have a size distribution between 40 microns to 250 microns.

16. The system as claimed in claim 1, wherein the reactor heat exchange unit utilizes combustion, and wherein the wall of the reaction chamber prevents transfer of combustion of gases to the reaction chamber.

\* \* \* \* \*